United States Patent [19]

Maruyama et al.

[11] Patent Number: 5,147,021
[45] Date of Patent: Sep. 15, 1992

[54] VENDING MACHINE

[75] Inventors: Yoshinori Maruyama, Kawagoe; Takeshi Ishida, Sakado, both of Japan

[73] Assignee: Nippon Conlux Co., Ltd., Tokyo, Japan

[21] Appl. No.: 622,377

[22] Filed: Dec. 5, 1990

Related U.S. Application Data

[63] Continuation of Ser. No. 249,886, Sep. 29, 1988, abandoned.

[30] Foreign Application Priority Data

Sep. 29, 1987 [JP] Japan ............................ 62-14755°[U]

[51] Int. Cl.⁵ ............................................... G07F 7/08
[52] U.S. Cl. ...................................... 194/217; 235/381
[58] Field of Search ............... 194/205, 210, 212, 213, 194/217, 218; 235/381

[56] References Cited

U.S. PATENT DOCUMENTS 3,935,933  2/1976  Tanaka et al. ...................... 194/210
4,669,596  6/1987  Capers et al. ..................... 194/217 X
4,809,837  3/1989  Hayashi .......................... 194/210 X

FOREIGN PATENT DOCUMENTS 52-28396  3/1977  Japan ................................ 194/205

Primary Examiner—F. J. Bartuska
Attorney, Agent, or Firm—Graham & James

[57] ABSTRACT

Money amount data and necessary discrimination data are recorded on a card and a card reader can read and write data on this card. A discarding circuit discards a money amount which is less than a money amount digit of a minimum denomination coin which can be handled from the money amount data read from the card. Money amount data left after discarding is added to a money amount of deposited coins and result of the addition is compared with a vend price for judgement as to whether vending is possible or not. Vend control of an article is made on the basis of this judgement. Discount is made from a predetermined vend price of the vended article. The vend price after the discount is subtracted from the money amount data read from the card by the card reader and the balance is caused to be written in the card by the card reader.

2 Claims, 1 Drawing Sheet

VENDING MACHINE

This is a continuation of application Ser. No. 249,886 filed on Sep. 29, 1988, now abandoned.

BACKGROUND OF THE INVENTION

This invention relates to a vending machine capable of vending an article by either cash or card.

A minimum unit of money amount digit which can be handled in money amount data processings in a vending machine generally is a money amount digit of a minimum denomination coin which can be handled by this vending machine, e.g., typically 10 yen in Japanese currency.

In other words, in prior art vending machines, a processing of money amount data less then 10 yen cannot be performed.

On the other hand, there has been proposed a vending machine in which a deferred payment type card can be used (e.g., Japanese Preliminary Patent Publication No. 52-28396). In such vending machine, money amount data of a card must be handled with a processing device which is originally adapted for handling coins and, as a result, minimum unit of money amount data of a card is obliged to be the money amount digit of the minimum denomination coin which can be handled, i.e., 10 yen.

There is, however, no such limitation in the minimum unit in writable money amount data of the card itself but money amount data to the unit of 1 yen can be written according to the specification of the card. An advantageous feature of the card type vending machine resides in that a discount amount in vending by using a card can be set even to a very small amount of 1 yen unit by processing money amount data on the basis of 1 yen unit.

In the prior art coin-card use type vending machine, however, restriction is imposed by the money amount data handling structure of the processing device adapted to handle coins so that the minimum unit of money amount data of the card cannot be less than the money amount digit of the minimum denomination coin which can be handled by the processing device. Hence, it is not possible in this vending machine to set a very small discount amount based on, e.g., 1 yen unit.

If a circuit for judging whether vending is possible or not on the basis of money amount data of a card is constructed separately and in a different manner from a circuit for judging whether vending is possible or not on the basis of money amount data of coins, the minimum unit of money amount data of the card can be set as desired without being limited by the money amount digit of the minimum denomination coin so that a discount amount can be set to a small amount. Such provision of two separate vend judgment circuits will however require a drastic change in the control system of the entire vending machine and the manner of transmitting data between a vend control circuit side and a coin control circuit side. This change is apparently cumbersome and costly.

SUMMARY OF THE INVENTION

It is, therefore, an object of the invention to provide a vending machine which utilizes the control system of the conventional coin type vending machine without substantially changing the control system and the manner of data transmission between the vend control circuit side and the coin control circuit side of the coin type vending machine and still can freely set minimum unit of money amount data of a card to an amount less than the money amount digit of minimum denomination coin without being limited by the minimum denomination coin and thereby can set a small discount amount.

The vending machine of the invention including judging means for judging whether vending is possible or not on the basis of comparison of an amount of deposited money with a vend price and processing money amount data using a money amount digit of a minimum denomination coin which can be handled comprises card reading and writing means which, when a card on which money amount data and necessary discrimination data are recorded is inserted therein, is capable of reading data from the card and writing money amount data on the card, discarding means for discarding a money amount less than the money amount digit of the minimum denomination from the money amount data read by the card reading and writing means, means for adding money amount data left after discarding by the discarding means to the amount of deposited money and applying result of the addition as total deposited amount to the judging means, discount means for effecting discount from a predetermined vend price of a vended article, and control means for subtracting a vend price after discounting from the money amount data read from the card by the card reading and writing means and causing the balance to be written in the card by the card reading and writing means.

Upon insertion of the card, the money amount data and discrimination data on the card are read by the card reading and writing means. The discarding means discards an amount s less than the money amount digit of the minimum denomination coin which can be handled (e.g., 10 yen) from the money amount data K read by the card reading and writing means. The money amount data K−s after the discarding which is provided by the discarding means is added to the deposited money amount and supplied to the judging means to be used therein for the vend possible judgement. If, for example, a money amount read from the card is 1003 yen, 3 yen which is less than 10 yen is discarded and 1000 yen is added to the deposited money and supplied to the judging means. If the deposited money by a coin at this time is 0,1000 yen by the card only is supplied to the judging means.

The judging means judges whether vending is possible or not on the basis of comparison of the deposited money amount (i.e., total amount of the coin and card) with the vend price in the same manner as in the conventional vending machine. As is well known, vending of an article is made on the basis of result of this judgment and an article selection operation by the purchaser.

Upon vending of the article, discount is made from a predetermined vend price SP of the vended article. A vend price SP' after the discount is subtracted from the money amount data K which has been read from the card by the card reading and writing means and the balance is caused to be written in the card by the card reading and writing means.

By this arrangement, the amount of discount for a single vending can be made an amount which is less than the money amount digit of the minimum denomination which can be handled by this vending machine (e.g., 10 yen), because, even when the balance which is written in the card after discounting of such odd discount amount becomes an amount including a fraction less than the money amount digit of the minimum denomination (e.g., 10 yen), this card amount data can be applied to the control circuit of the conventional vending machine including the judging means. In other words, even if the judging means and other circuits are of the conventional construction in which money data processings including comparison and judgement of a deposited amount and a vend price are made by using, as the minimum digit, the money amount digit of the minimum denomination coin which is handled (e.g., 10 yen), no inconvenience takes place because the amount s less than the money amount digit of the minimum denomination in the money amount data K in the card is discarded by the discarding means to correct the money amount data to K−s which does not include a fraction less than the money amount digit of the minimum denomination and this corrected money amount data K−s is supplied to the judging means.

An embodiment of the invention will now be described with reference to the accompanying drawing.

BRIEF DESCRIPTION OF THE DRAWING

In the accompanying drawing.

DESCRIPTION OF THE PREFERRED EMBODIMENT

Figure 1:
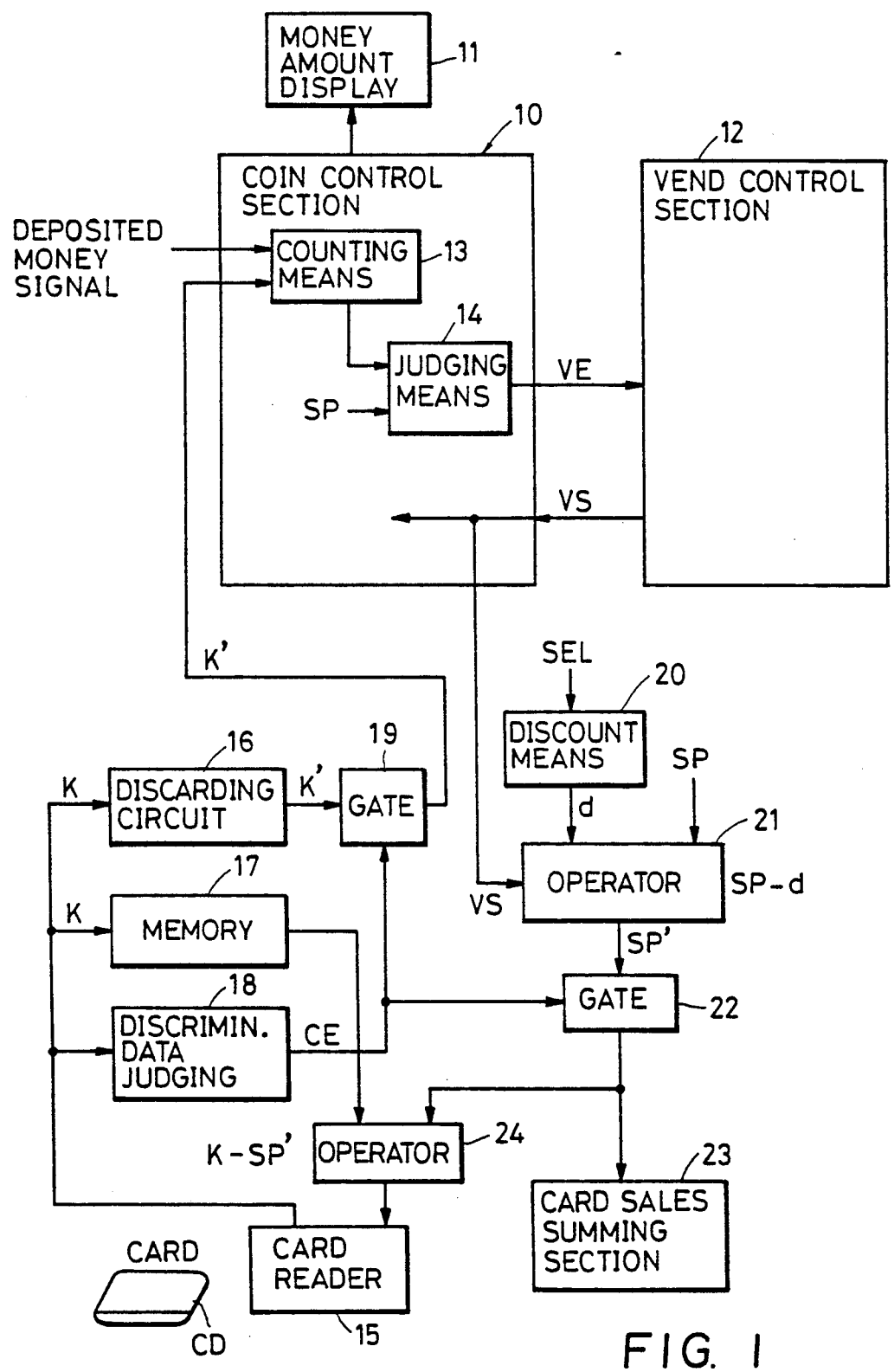
FIG. 1 is a block diagram showing an embodiment of the vending machine according to the invention.

Referring to FIG. 1, a coin control section 10 has processing functions relating to a coin and/or a bill including a function of counting an amount of deposited coins and/or bills, a function of judging whether vending is possible or not on the basis of comparison of a deposited amount with a vend price and a fuction of calculating and paying out change. These functions are conventional in the prior art vending machines. The minimum money amount digit of money amount data handled here is the money amount digit of a minimum denomination coin which is handled (e.g., 10 yen). A money amount display 11 displays mainly contents of coins counted. The display 11 can be used concurrently for displaying functions including a sales sum display function. A vend control section 12 receives a vend possible signal from the coin control section 10 and thereupon performs vending of a selected article.

Typical examples of the coin control section 10 and the vend control section 12 will now be described. In the coin control section 10, the amount of deposited coins and/or bills is counted by counting means 13 and the output of this counting means 13 and vend price SP are compared with each other by judging means 14. When vending is possible, a vend possible signal VE is provided. In the vend control section 12, upon receipt of the vend possible signal VE with respect to an article selected by the purchaser, this article is dispensed. Upon execution of dispensing of the article, the vend control section 12 produces a vend start signal VS and supplies this signal to the coin control section 10. In the coin control section 10, upon receipt of the vend start signal VS, the vend price SP of the vended article is substracted from the contents of counting of the counting means 13. The change is paid out in accordance with the contents of the counting means 13. Such control operations of the coin control section 10 and the vend control section 12 are known and the above described operation are only exemplary.

As the card reading and writing means, a card reader 15 is provided. Upon insertion of a card CD into this card reader 15, money amount data and discrimination data recorded on this card CD are read. It is assumed that this card CD is a deferred payment type card. A discarding circuit 16 inputs money amount data K read from the card CD and discards from the money amount data K and amount s which is less than the money amount digit of the minimun denomination coin which is handled by this vending machine (e.g., 10 yen). Money amount data after discarding which is provided by the discarding circuit 16 is designated by reference character K'. In the case of discarding, for example, an amount less than 10 yen, if the money data amount K is 1003 yen, K' is 1000 yen and, if K is 1100 yen, K' is the same 1100 yen.

A memory circuit 17 stores the money amount data K read from the card CD as it is. A discrimination data judging circuit 18 judges whether the inserted card CD is an authentic card or not on the basis of the discrimination data read from the card CD. If the card CD is an authentic card, the circuit 18 generates a card detection signal CE.

A gate 19 is opened by the card detection signal CE and the money amount data K' provided by the discarding circuit 16 is gated out and supplied to the counting means 13 to be added to the deposited money amount. In this manner, the money amount K' which is an amount left after discarding the amount s less than the money amount digit of the minimum denomination (e.g., 10 yen) from the amount K of the card CD is counted and added by the counting means 13.

This amount K' (if simultaneous deposition of a coin with the card is possible, this amount may be a total sum with the amount of the coin) is compared with the vend price SP by the judging means 14. If vending is possible, the vend possible signal VE is produced and vending operation is made by the vend control section 14 in accordance with selection of an article. Upon start of the vending operation, the vend start signal VS is provided.

Discount means 20 can set an amount or rate of discount individually for each article and provides data d of a discount amount or discount rate set in correspondence to an article which has been vended by the current vending operation in response to a selection signal SEL for such article. This discount amount can be set at a value less than the minimum denomination coin (e.g., 10 yen) which is handled by this vending machine.

An operator 21 conducts an arithmetic operation with respect to the vend price SP of the article which has been vended by the current vending operation and the data d of the discount amount or rate and produces a vend amount SP' after the discount. The output timing of this vend amount SP' is set after generation of the vend start signal VS. If, for example, the data d is data for discount amount, the subtraction SP'=SP−d is performed by the operator 21. The vend amount SP' after the discount is supplied through the a gate 22 to a card sales summing section 23 and an operator 24. When the authentic card CD has been inserted, the gate 22 is opened in response to the card detection signal CE.

The card sales summing section 23 sums up sales amount when articles have been vended by using the card CD.

The operator 24 subtracts the vend amount SP' after the discount from the genuine amount K of the card CD stored in the memory circuit 17 to obtain the balance of the card. The output of the operator 24 therefore may include a fraction less than 10 yen. The balance data calculated by the operator 24 is written in the card CD by the card reader 15 whereby the amount data of the card CD is rewritten.

As the card CD, not only a magnetic card but any other type of card such as an IC card and a laser card may be used.

Instead of storing the genuine amount data K of the card CD in the memory circuit 17, the amount s which has been discarded by the discarding circuit 16 may be stored in the memory circuit 17, the vend amount SP' after the discount may be subtracted from the amount data K' after discarding in the counting means 13 and the balance data to be written in the card CD may be obtained by adding the difference produced by the subtraction and the stored amount s after discarding.

The above described embodiment is shown by a hardware block diagram but this invention may be carried out also by a software processing utilizing a microcomputer.

In the above described embodiment, cash can be used simultaneously with the card. The vending machine however may be so constructed that cash and card cannot be used simultaneously so long as the coin control section for coins can be used by the money amount data of the card without particular modification of the coin control section.

As described above, according to the invention, the amount s less than the money amount digit of the minimum denomination coin handled by the vending machine (e.g., 10 yen) is discarded from the money amount data K read from the card and the money amount date K−s after the discarding is added to the deposited money amount for comparison and judgement with the vend price. Accordingly, the control system of the conventional coin type vending machine can be utilized without substantially changing the control system and the manner of data transmission between the vend control circuit side and the coin control circuit side of the conventional coin type vending machine. Besides, a money amount less than a money amount digit of a minimum denomination coin which is handled by the coin type vending machine can be processed as desired so that services such as setting of a fine discount amount can be offered.

What is claimed is:

1. A vending machine including judging means for judging whether vending is possible or not on the basis of comparison of an amount of deposited money with a vend price, and being adapted for processing money amount data using a minimum money amount digit of a minimum denomination coin or bill handleable by the machine, said vending machine comprising:

card reading and writing means for receiving a card on which money amount data including data of a money amount less than the minimum money amount digit and necessary discrimination data are recorded and reading the data from the card and writing money amount data on the card;

memory means for storing said money amount data including data of a money amount less than the minimum money amount digit that has been read by said card reading and writing means;

discarding means for discarding a money amount less than the minimim money amount digit from said money amount data read by said card reading and writing means;

means for adding money amount data left after discarding by said discarding means to the amount of deposited money and for applying the result of the addition as total deposited amount to said judging means;

discount means for effecting a predetermined discount from a predetermined vend price of a vended article for a discount amount or at a discount rate that can be set for said money amount less than the minimum money amount digit; and control means for substracting a vend price after said discount from the money amount data that has been read from the card by said card reading and writing means and stored in said memory means, and for causing the balance to be written in the card by said card reading and writing means.

2. A vending machine as defined in claim 1 wherein an amount of discount by said discounting means includes the money amount less than the money amount digit of the minimum denomination.

* * * * *